United States Patent [19]

Boero

[11] Patent Number: 4,786,135

[45] Date of Patent: Nov. 22, 1988

[54] CONNECTOR FOR OPTICAL FIBER CABLES

[75] Inventor: Paolo Boero, Milan, Italy

[73] Assignee: Societa' Cavi Pirelli S.p.A., Milan, Italy

[21] Appl. No.: 943,618

[22] Filed: Dec. 18, 1986

[30] Foreign Application Priority Data

Dec. 18, 1985 [IT] Italy ................. 23268 A/85

[51] Int. Cl.$^4$ ............................................. G02B 6/36
[52] U.S. Cl. ............................ 350/96.21; 350/96.18
[58] Field of Search ............... 350/96.18, 96.20, 96.21

[56] References Cited

U.S. PATENT DOCUMENTS

| | | | |
|---|---|---|---|
| 4,183,618 | 1/1980 | Rush et al. | 350/96.21 |
| 4,291,941 | 9/1981 | Melzer | 350/96.18 |
| 4,563,057 | 1/1986 | Ludman | 350/96.18 |
| 4,639,076 | 1/1987 | Mikolaicyk et al. | 350/96.18 |

Primary Examiner—Gene Wan
Attorney, Agent, or Firm—Brooks Haidt Haffner & Delahunty

[57] ABSTRACT

A connector for interconnecting optical fiber cables or an optical fiber with an optical component, the cable or cables having an optical fiber encircled by a tension resistant member comprising a yarn. The connector has a hollow cylindrical body which slidably receives a lens mount with a lens thereon, the optical fiber is secured to the lens mount and the tension resistant member is secured to the body so that the cable can be pulled without applying damaging stress to the optical fiber. The lens mount is spring biased into its normal position in which is couples optical signals to another cable or to an optical component.

9 Claims, 4 Drawing Sheets

CONNECTOR FOR OPTICAL FIBER CABLES

The present invention relates to an expanded beam connector for optical fiber cables wherein the fibers are protected against the effects of the axial stresses which tend to impair the optical coupling and/or the mechanical resistance of the fibers.

Expanded beam connectors are used for aligning and optically coupling one or more facing optical fiber pairs, or one or more optical fibers of a cable with an optoelectronic component. In particular, expanded beam connectors provide for the inclusion of pairs of lenses between the surfaces of the fibers or components to be coupled so as to reduce the losses due to axial and/or transverse misalignments and to facilitate the connection.

The term "optical fiber cable", as used herein, refers to a transmitting member formed by one or more optical fibers (provided with at least one coating) and one or more members resistant to tensile and/or compressive stresses. Moreover, such a cable can be provided with different coatings and/or layers of different materials depending on its use.

Therefore, an optical fiber cable according to its simplest construction can comprise an optical fiber provided with a primary and secondary coating and surrounded by a sheath, braiding or other outer coating member for taking up the tensile stresses without transmitting them to the fiber.

Alternatively, in a more complicated structure, an optical fiber cable can comprise a plurality of optical fibers, stranded together on a supporting member or wound up on a tension resistant member at the central portion of the cable and coating and protective layers.

For the sake of simplicity, in the following, reference will be made mainly to a symmetrical connector, i.e. a connector comprising two equal half-portions, either for a simple cable formed by only one optical fiber coated and surrounded by a textile braiding with the function of providing tension resistance, or for cables comprising two or more of said elementary cables. However, the invention may also be applied, for example, to panel connectors, cables having different structures, etc.

The expanded beam connectors of a conventional type have some limitations due to their sensitivity to axial stresses.

For example, in connectors of the known type, to connect two elementary cables, each formed by only one fiber with a protective coating and an outer braiding, each end of the cable is rigidly secured to the corresponding half-portion of the connector to protect the fiber from possible tensile stresses. This structure is obtained by securing, through a crimping or gluing operation, the connector half-portion to the fiber, or preferably, to the coating adhering to the fiber, and then by fixing the half-portion to the end portion of the braid which is resistant to tensile stresses, again by a crimping or gluing operation.

During the crimping or gluing operation, the fibers or yarns forming the braid are kept as parallel as possible to the axis of the fiber so as to reduce to the minimum the clearance between the cable and the connector half-portion allowed under tensile stresses. Since the braid clearance cannot be completely eliminated and when the cable is pulled, a mechanical tensile and/or bending stress is transmitted to the fiber, and this can impair the fiber status. Similar systems are also used for multiple fiber connectors, i.e. for connectors used together with cables formed by two or more optical fibers.

Moreover, in the case of cables comprising a plurality of optical fibers, it can be difficult to cut all the fibers precisely enough so that when they are connected to a single expanded beam connector of known type and even in the absence of stresses applied to the cable, the subjecting of some fibers to tensile stresses and the subjecting of some other fibers to compressive stresses is prevented.

Therefore, the connections between optical transmitting elements must be carried out with considerable care as compared with electrical connections, in particular, with respect to casual pulling, and this restricts the use of optical fiber transmission, for example, in local networks, between processing equipment, etc.

Therefore, one object of the present invention is to provide an expanded beam connector for optical fiber cables which prevents axial stresses applied to the cable from being transmitted to the optical fibers and which, at the same time, maintains the exact mutual positioning of the fiber and the lens so as not to impair the functions of the connection. The axial stresses can be tensile and/or compressive stresses depending on the cable type as will be apparent hereinafter.

Another object of the present invention is that of realizing an optimum positioning of the lenses in a connector of the type described.

A further object of the invention is that of making less critical the mounting tolerances in multiple fiber type connectors.

The expanded beam connector of the invention for an optical fiber cable, which comprises at least an optical fiber and a stress resistant member, comprises two connector half-portions, at least one of which houses the end of at least an optical fiber and an associated collimating lens, and means for positioning and joining the two half portions, and is characterized by the fact that at least one of the half-portions comprises a cylindrical body with an axial bore housing a lens support for each optical fiber and to the latter of which the end of the optical fiber is firmly secured, said support being permitted a limited longitudinal movement with respect to said body to which the stress resistant member is secured.

Other objects and advantages of the present invention will be apparent from the following detailed description of the presently preferred embodiments thereof, which description should be considered in conjunction with the accompanying drawings in which.

Figure 1:
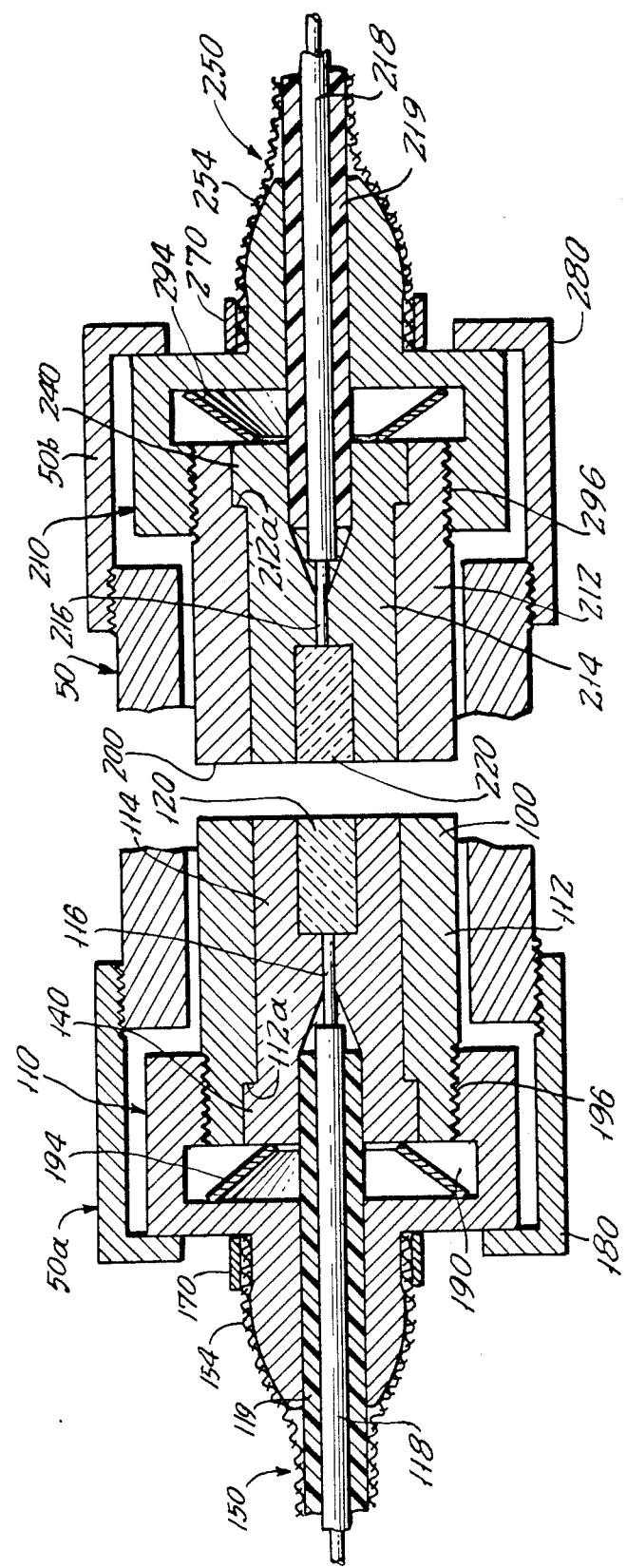
FIG. 1 is a longitudinal section of a connector according to the invention applied to a single-fiber cable.

The connector shown in FIG. 1 comprises two equal connector half-portions 110, 210 and means to position and interconnect the two half-portions 110 and 210 which is schematically represented by the threaded sleeve 50 and the ring nuts 50a and 50b. The sleeve is shown partially interrupted, and the two half-portions are shown spaced apart for sake of clarity.

The two half-portions 110 and 210 are similarly constructed. The half-portion 210 will not be described in detail, but its elements will be readily apparent by reason of the fact that the last two digits of the reference numerals of corresponding parts of the two half-portions are the same.

The left half-portion 110 comprises a hollow cylindrical body 112 which houses an axially movable lens support 114 (with a central bore) for the lens 120. The lens 120 illustrated is of cylindrical type with a radially depending index of refraction, but it could be replaced with an equivalent spherical or other type lens.

At one side, the lens 120 is co-planar with the surface 100 which engages the corresponding surface 200 of the right half portion, and at the other side, the lens 120 is coupled with the end of the optical fiber 116 of the cable 150.

The cable 150 comprises a fiber 116 provided with a primary coating 118 and, a secondary coating 119, and an outer reinforcing braid 154 formed by a yarn or a fiber, for example, an aromatic polyamide such as Kevlar, which constitutes the cable tension resisting member.

The half connector 110 also comprises a closing nut 180 secured to the body 112 by means of threads 196 and a ferrule 170 for securing the reinforcing yarn or fiber 154 to the half-portion 110 by crimping or gluing.

Between the inner part of the nut 180 and the assembly formed by the body 112 and the lens support 114, there is a cavity 190 of circular cross-section in which elastic means 194, for example, a Belleville washer, a spiral spring, a elastomeric body, etc., is disposed to oppose axial movement of the support 114 with respect to the body 112.

The diameter of the lens support 114 is such that this latter can axially slide within the body 112. An enlarged portion 140 abuts a circular seat 112a of the body 112 which has a depth which will prevent the lens support 114 from projecting outwardly from the surface 100 and so that the lens 120 will be in the best position for the optical coupling when the lens support 114 is in contact with the lens support 214.

The optical fiber 116 is firmly secured to the lens support 114 by gluing it to, or crimping it on, the secondary coating 119 of the fiber 116. The yarn or fiber 154 constituting the cable braid is secured to the half-portion 110 by the ferrule 170.

The fiber 116 -lens support 114 assembly slides within the body 112 and is maintained in a position which is optimum for the optical coupling due to the elastic means 194.

When the cable 150 is subjected to a tensile stress, the stress is first transmitted to the fiber 160, or more precisely, to the fiber outer coating 119 because of the unavoidable clearance caused by the braid 154 which is able to assume the stress only after the fiber 116 with its layers 118 and 119 have moved a small amount axially to the left, as viewed in FIG. 1.

In the prior art connectors in which the fiber connector half-portion assembly is substantially rigid, the fiber supports the whole load applied to the cable with a rupture of the fiber itself being most likely.

In contrast, in the connector according to the invention, the fiber-lens support assembly 114, 116 can respond to the tensile stress initially by axially sliding toward the cavity 190. Said sliding movement is practically unresisted since the elastic element 194 provides a very low resistance. Thus, the fiber-lens support assembly 116, 114 can move under tensile stress until the yarn or fiber 154 opposes the stress by completely absorbing the stress.

In a typical pulling stress, the force acting on the cable is generally higher than the resistance offered by the crimping or gluing operation which secures the optical fiber to the connector, and in the conventional connectors, this has caused the failure of the connection. In contrast, in the connector according to the invention, this force acting at first on the optical fiber is not opposed and, subsequently, it is absorbed by the stress resistant member 154 which, because of the ferrule 170, is firmly secured to the connector.

The movement of the fiber-lens support assembly 116, 114 alters, at least temporarily, the mutual positions of the two fiber-lens assemblies, i.e., the position of the lens 120 and the support 114 relative to the lens 220 and the support 214. However, such alteration of the positions does not impair the coupling between the two cable fibers 116 and 216. In fact, the output light beams of the lenses, in addition to being wider than the beam traveling along the fiber, is focused at a very far point, theoretically to infinity. Therefore, the output light beams of the lenses are substantially parallel to the axis of the connector and an axial movement of the lenses does not cause a substantial reduction of the transferred light.

In fact, if desired, the elastic means 194 and/or 294 can be omitted, either in the connector of FIG. 1, or in those illustrated later on, because small variations of the distance between the two lenses 120 and 220 do not impair the optical coupling, although, obviously, the coupling between the fibers will no longer be the best one in the absence of the elastic means and the supports 114 and 214 rest at spaced apart positions.

The connector according to the invention besides withstanding tensile stresses up to values sufficient to impair the whole cable mechanically, protects, to a certain extent, with respect to non-axial stresses since the latter generally comprise a bending and tensile component, the latter component being absorbed by the connector.

Figure 2:
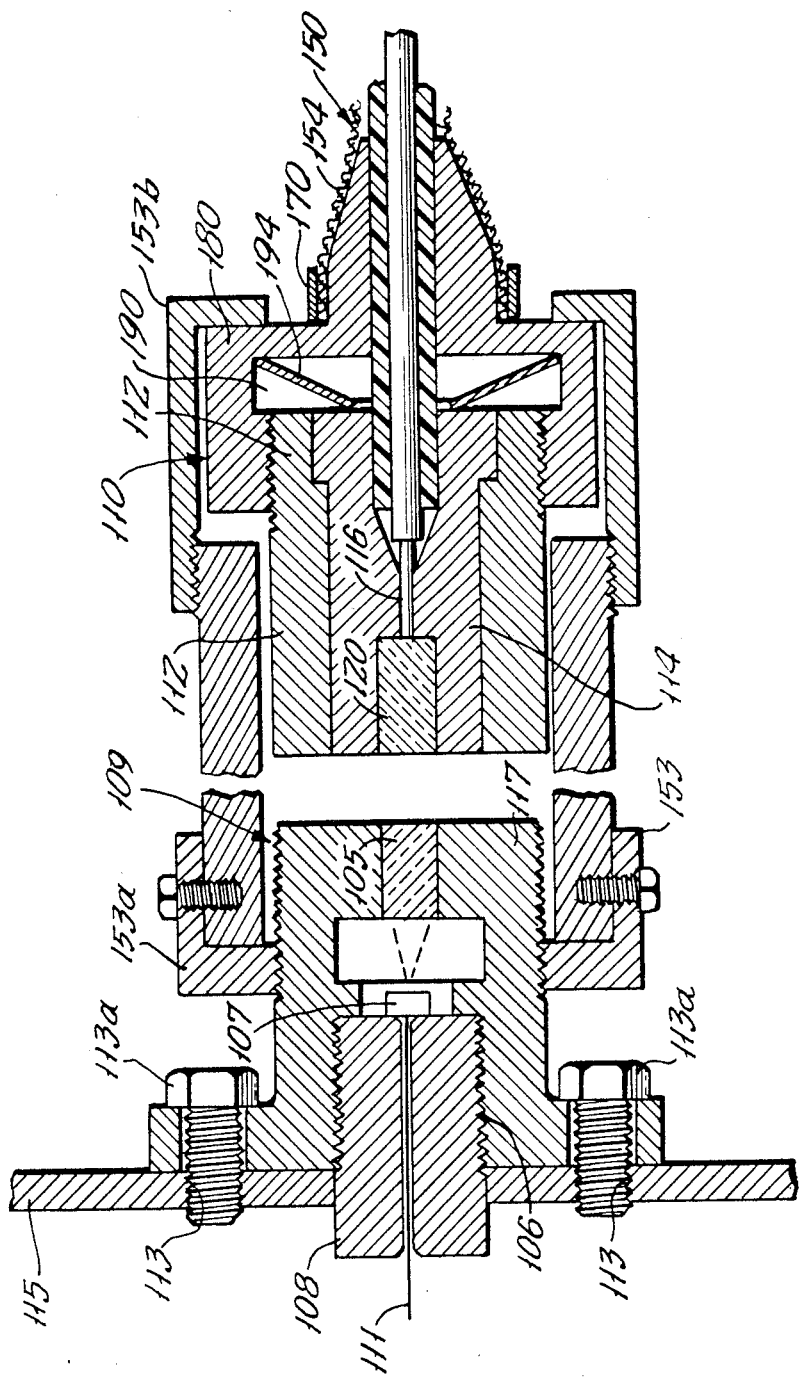
FIG. 2 is a longitudinal section of a panel connector according to the invention for connecting a single-fiber cable with an optoelectronic device.

The expanded beam connector shown in FIG. 2 is of the type suitable to be mounted on a base, panel and the like 115, to connect an optical fiber cable 150 to an optoelectronic component 107, such as, for example, a light emitting diode, or a photodiode or other device connected by conductors 111 to a transmitting or receiving equipment (not shown).

In this embodiment, the two connector half-portions 110 and 109 have different structures. In particular, the half-portion 110 is the same as either of the two connector half-portions shown in FIG. 1, whereas the connector half-portion 109 is formed in such a way as to secure the optoelectronic component 107 and to be secured to the panel 115 by threaded holes 113 and screws 113a. In the half-portion 109, no axial movement is provided for the lens 105 which is also secured within the body 117 of the half connector 109, at a pre-established distance from the component 107. The component 107 is mounted on the cylindrical body 108 with an axial bore and provided with a thread 106 which allows the best positioning thereof with respect to the lens 105. A sleeve 153 joins the two half connectors according to known techniques such as by the ring nuts 153a and 153b.

Figure 3:
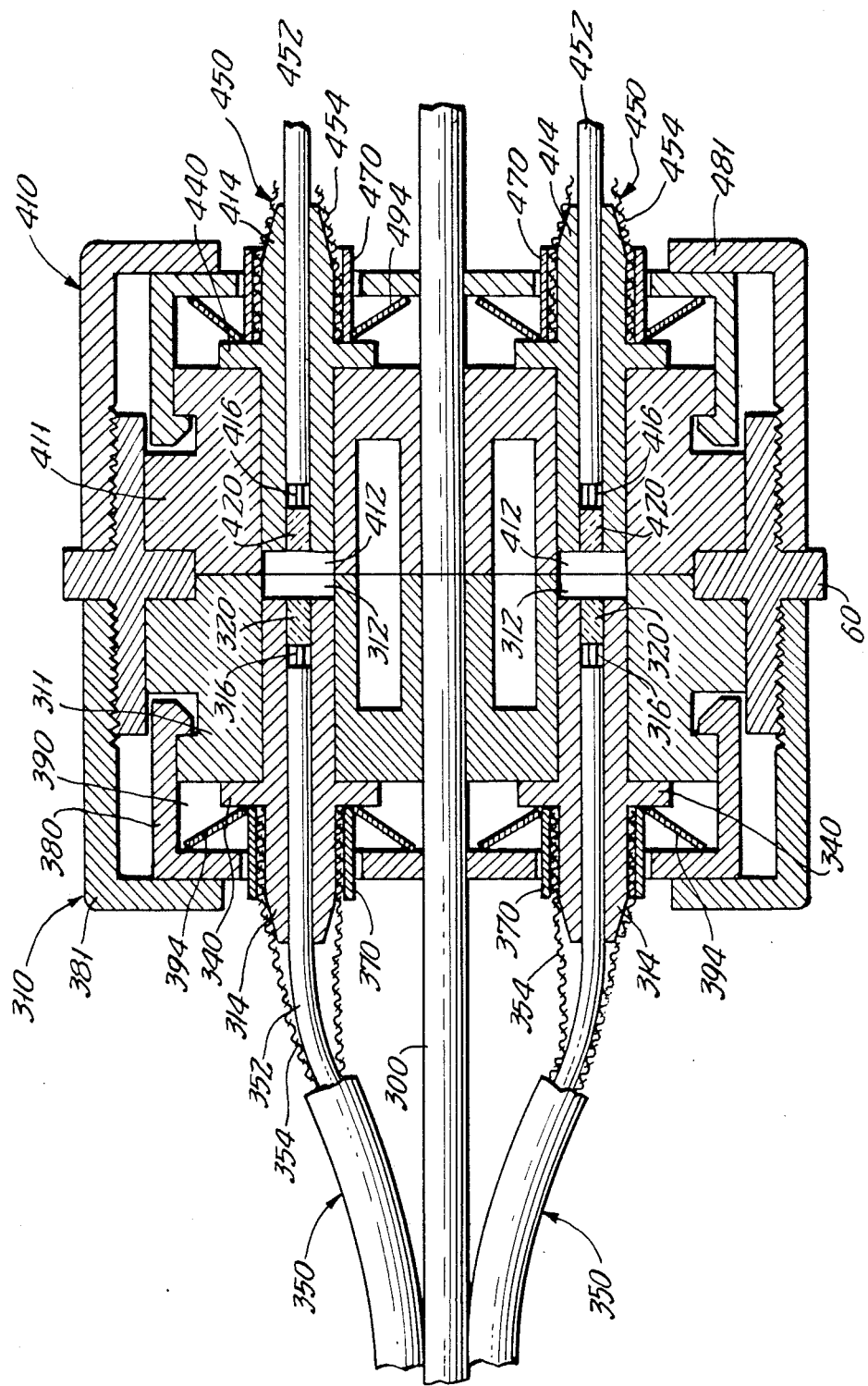
FIG. 3 is a longitudinal section of a connector according to the invention applied to a multi-fiber cable.

FIG. 3 shows the section of a connector according to the invention and for connecting together the fibers of two optical fiber cables, each cable comprising four optical fibers 350 and 450 (only two fibers being visible in FIG. 3) wound or arranged around a central member 300 which may be a member resistant to tensile stresses only, to tensile and compressive stresses, or a simple support.

The connector comprises two equal connector half-portions 310, 410 joined through the double threaded sleeve 60 and the threaded nuts 381 and 481. As with FIG. 1, the last two digits of the reference numerals of the corresponding parts of the two half-portions are the same.

The half-portion 310 comprises a cylindrical body 311 with four through-holes 312 of circular cross-section and having axes parallel to one another and parallel to the axis of the half-portion 310. The holes 312 of the two connector half-portions are maintained in the corresponding positions by the sleeve 60 which may be a conventional type for such purpose.

Each hole 312 receives a tubular lens support 314 free to slide, within predetermined limits and independently of the other supports, in the hole 312. The lens 320 and the fiber 316 with the primary and secondary coatings, indicated as a whole with reference numeral 352, are housed in and rigidly secured to the lens support 314.

With respect to the fiber-lens coupling, the function of the lens and the types of lenses used, the same considerations already outlined for the cable connector of FIG. 1 apply.

By way of example, the cable shown in FIG. 3 is formed by single-fiber cables 350, which are the same as those indicated in FIG. 1 by reference numeral 150, stranded around a central member 300 constituted, for example, by a fiberglass-reinforced plastic rod. However, as already mentioned, the central member 300 can have different mechanical characteristics (a tensile and/or compressive resistance) or be a simple support rod, for example, of polyurethane, for the stranding of the single-fiber cables 350 therearound.

The central member 300 is secured to the connector half-portion 310, for example, by a nut (not shown) threaded in the cylindrical body 311 or by a gluing or crimping operation.

The tensile resistant braids 354 and 454 of each cable are secured to he corresponding lens support 314, for example, by means of the ferrules or rings 370 with a crimping operation. Inside the cup-shaped member 380 which is secured to the body 311, there is a cavity 390 wherein elastic means 394 for each lens support 314 is disposed, said elastic means 394 pushing the lens support 314 against the body 311. The elastic means 394 are independent of one another, i.e. there is a elastic means 394 for each support 314, and each may be constituted by a single elastic means such as a Belleville washer, a spiral spring, an elastomeric body or the like arranged between the projection 340 of each lens support 314 and the inner wall of the member 380.

The elastic means 394 accomplishes first of all the function of the elastic means 194 of FIG. 1 for the single-fiber connector, i.e. they allow the absorption, within certain limits, of possible clearances which could delay the action of the stress absorbing member 300, which frictionally engages the cable 350, without applying to the optical fiber other loads other than those exerted by the elastic means 394 themselves.

Moreover, the elastic means 394 have the function of axially positioning each single lens support 314, within certain limits, independently of the others so that with a negligible load on every fiber (due only to the elastic members 394 themselves), it is possible to compensate length differences or shrinkages of each single-fiber cable 350 ending in the corresponding lens supports 314. The length differences or shrinkages can be due to different reasons, such as loads applied to the cable, or construction and/or connection tolerances.

It is to be noted that the projecting members 340 prevent the lens supports 314 from escaping by way of the facing surfaces of the bodies 311 and 411 and, at the same time, ensure an optimal optical coupling of the lens 320 and 420 when the projection 340 abuts against the cylindrical body 311. For clarity in illustration, in FIG. 3, the facing lenses 320 and 420 are shown spaced apart but normally, they would be substantially in contact with one another.

Therefore, the function of the elastic members 394 is that of maintaining the lenses 320 as near as possible to the ideal position, compatibly with the other imposed constraints and without dangerous stresses on the fibers.

In case of significant differences in the lengths of the fibers of the cables, not all the projections 340 can abut the body 311 and the coupling can be not the best for some fibers. However, this partial drawback, which does not impair the optical coupling, will be acceptable in view of the automatic compensation of the length differences.

The rigid fiber-lens coupling inside the lens support 314 is associated to the movability of the lens supports themselves in the cylindrical cavities 390 is the essential feature which allows both the mechanical flexibility (absorption of clearances and/or working tolerances without stresses on the fibers) and the good optical characteristics (due to the fiber-lens rigid coupling and to the collimation of the light beam emerging form the lens).

Figure 4:
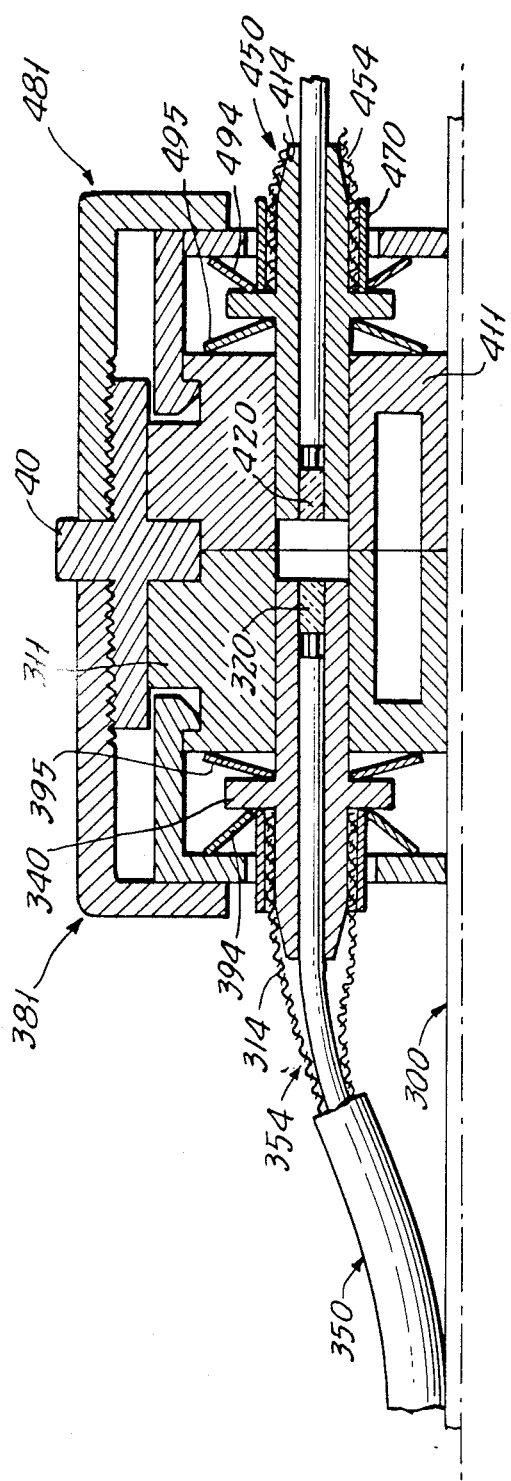
FIG. 4 is a longitudinal half-section of an alternative embodiment of the connector of FIG. 3.

FIG. 4 shows a partial section of an alternative embodiment of the connector of FIG. 3. As the structure of this embodiment is very similar to that of the connector of FIG. 3, FIG. 4 shows only a part of the connector and the same reference numerals have been used for analogous components.

The alternative embodiment shown in FIG. 4 is suitable for cables in which the central member 300 is of the tensile and compressive resistant type and differs from the embodiment of FIG. 3 by reason of the presence of further elastic means 395 positioned between the projection 340 of the lens support 314 and the surface of the body 311.

These further elastic means 395 which act in opposition to the elastic means 394 can be added if particular conditions should require it, for example, to apply a progressive load to the fiber, in case of compressive stresses and to damp possible vibrations.

It will be apparent that the use of two opposed elastic means can be applied also to the single-fiber connectors of FIGS. 1 and 2. By this structure, the coupling of the lenses at rest can be less satisfactory for some lens types. However, in some applications, the previously described advantages can be preferred to an optimal positioning of the lenses.

As already mentioned, in the embodiments shown in FIGS. 3 and 4, elastic means can be omitted and in this case, the best lens positioning is not achieved but has the advantage of a simpler construction.

It will be apparent that the invention achieves the stated objects. In fact, the connector according to the invention ensures that the stress resistant members become effective before dangerous stresses are applied to the fibers.

Moreover, in case of a cable connector with a member resistant only to tensile stresses, the best positioning of the lenses (in the absence of stresses on the cable) is obtained since the lens supports abut against their projections at pre-established distances and are maintained in this position by the elastic members.

Finally, in case of multiple connectors, suitable for cables comprising two or more optical fibers, the mounting tolerances are made less critical. In particular, the mutual longitudinal positioning of the lens supports of each inter-coupled pair of cables makes them relatively insensitive to length differences in or shrinkages of the cables.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A connector for an optical fiber cable which comprises at least an optical fiber surrounded by a tension resisting member comprising at least one yarn, said connector comprising:
    a hollow cylindrical body having a first end and a second end;
    means for securing said body to another body;
    a lens support mounted in said hollow cylindrical body for sliding movement axially of the latter in the direction from said first end toward said second end of said body, said support having an axially extending bore for receiving said optical fiber and said lens support being securable to the outer surface of said optical fiber for causing axial movement of said lens support with axial movement of said optical fiber;
    a lens mounted in said bore at the end thereof nearer said first end of said body for receiving an end of said fiber in energy coupling relation;
    elastic means acting between said hollow cylindrical body and said lens support and urging said lens support toward said first end of said body; and
    means for securing said tension resisting member to said hollow cylindrical body;
whereby with forces applied to said cable which tend to pull the optical fiber out of said hollow cylindrical body, said lens support moves axially against the force of said elastic means until slack in said tension resisting member is taken up at which time the pulling force is applied to the hollow cylindrical body by said tension resisting member.

2. A connector as set forth in claim 1 wherein said another body comprises:
    a further hollow cylindrical body axially alignable with the first-mentioned said hollow cylindrical body;
    a further lens support mounted in said further hollow cylindrical body for sliding movement axially of the latter, said further lens support having an axially extending bore for receiving an end of a further optical fiber in a further cable and surrounded by a further tension resisting member;
    a further lens mounted in said bore of said further lens support at the end thereof which faces said end of said bore of the first-mentioned said lens support for receiving an end of said further optical fiber in energy coupling relation; and
    further means for securing said further tension resisting member to said further hollow cylindrical body.

3. A connector as set forth in claim 1 wherein said optical fiber cable comprises at least one protective layer intermediate said optical fiber and said tension resisting member and wherein said bore of said lens support is adapted to receive said at least one protective layer therein.

4. A connector as set forth in claim 1 further comprising further elastic means acting between said hollow cylindrical body and said lens support and opposing the first-mentioned said elastic means.

5. A connector as set forth in claim 1 wherein said another body comprises:
    a further hollow cylindrical body axially alignable with the first-mentioned said hollow cylindrical body;
    a further lens mounted within said further hollow cylindrical body and axially alignable with said lens in said bore of said lens support; and
    an optoelectronic converter mounted within said further hollow cylindrical body in alignment with said further lens.

6. A connector as set forth in claim 5 wherein said further hollow cylindrical body comprises means for securing it to a wall.

7. A connector for interconnecting a first plurality of optical fiber cables with a second plurality of optical fiber cables, each said optical fiber cable comprising at least one optical fiber surrounded by a tension resisting member comprising at least one yarn, and said first plurality of cables being arranged around a first central member and said second plurality of cables being arranged around a second central member, said connector comprising two identical, oppositely facing half-portions and means for securing one of said half-portions to the other of said half-portions, each said half-portion comprising:
    a cylindrical body having a first end and a second end and having a central axial bore for receiving a central member of one of the first and second central members and having a plurality of further axially extending bores equal in number to the number of optical fiber cables in one of the plurality of optical fibers disposed around and spaced from said central axial bore;
    a plurality of lens supports mounted, respectively, in said further axially extending bores for sliding movement axially of the latter in the direction from said first end toward said second end of said body, each of said lens supports having means at one end thereof for securing the tension resisting member of a said cable thereto and having a bore for receiving the optical fiber of the last-mentioned cable; and
    a plurality of lenses mounted, respectively, in a said bore of each of said lens supports at the opposite end thereof for receiving and end of a fiber in a bore of a lens support in energy coupling relation.

8. A connector as set forth in claim 7 further comprising a plurality of elastic means, one for each of said lens supports, acting between said cylindrical body and each lens support and urging its associated lens support in the direction from its said one end toward its said opposite end.

9. A connector as set forth in claim 8 further comprising a plurality of further elastic members, one for each of said lens supports, acting between said cylindrical body and each lens support and opposing the first-mentioned elastic means.

* * * * *